Sept. 17, 1929. L. J. BORKHUIS 1,728,326
GUARD TOOTH FOR MOWERS
Filed April 10, 1929 3 Sheets-Sheet 2
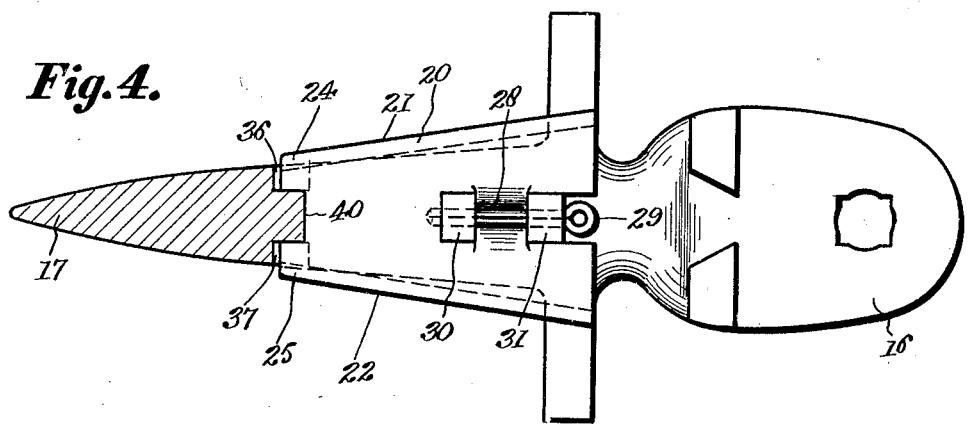
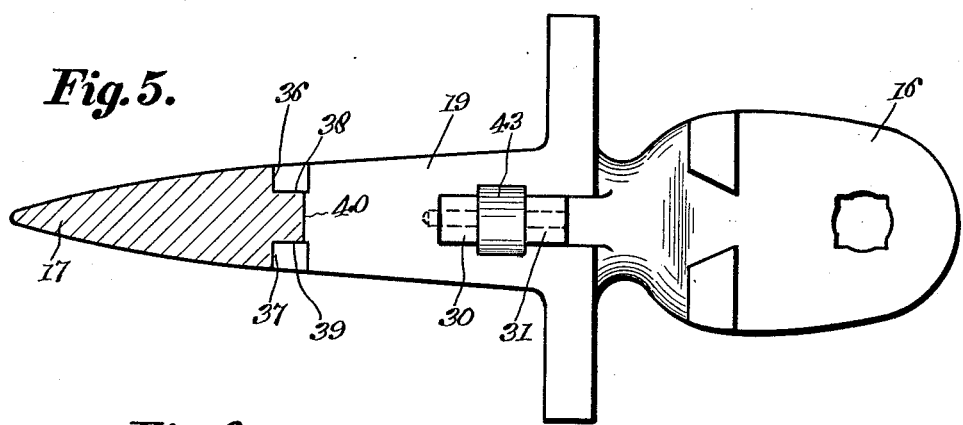
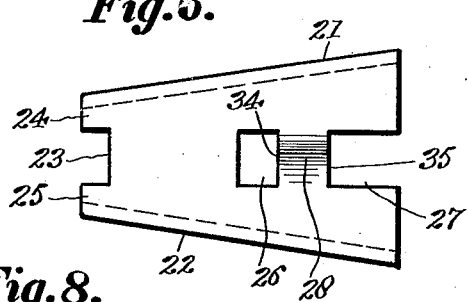
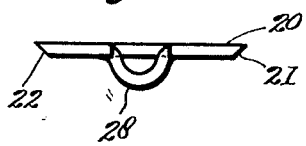
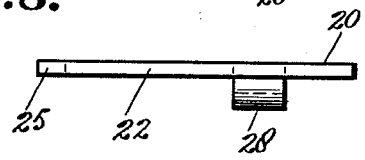
L. J. Borkhuis, Inventor
By Arthur H. Sturges, Attorney Sept. 17, 1929.  L. J. BORKHUIS  1,728,326

GUARD TOOTH FOR MOWERS

Filed April 10, 1929  3 Sheets-Sheet 3

Inventor
L. J. Borkhuis,
By Arthur H. Sturges.
Attorney

Patented Sept. 17, 1929

1,728,326

UNITED STATES PATENT OFFICE

LOUIS J. BORKHUIS, OF VAYLAND, SOUTH DAKOTA

GUARD TOOTH FOR MOWERS

Application filed April 10, 1929. Serial No. 353,982.

The present invention relates to improvements in guard tooth for mowers, and has for an object to provide an improved guard tooth for mowing machines, wherein the ledger plate will be firmly held in position and against longitudinal or lateral motion, whereby to effectively cooperate with the cutter bar.

Another object of the invention is to provide an improved guard tooth constructed to cooperate with the removable ledger plate and formed complementally to the ledger plate, whereby to coact therewith in supporting and retaining the ledger plate rigidly in the guard tooth.

A further object of the invention is to provide an improved guard tooth for mowers and the like in which the disengagement and loss of the ledger plate is avoided while providing for an economical and simple construction of ledger plate and tooth.

A still further object of the invention is to provide an improved ledger plate and guard tooth in which provision is made for locking the tooth in place, and for readily disengaging said locking means when the ledger plate is to be renewed.

With the foregoing and other objects in view, the invention will be more fully described hereinafter and will be more particularly pointed out in the claims appended hereto.

In the drawings, wherein like symbols refer to like or corresponding parts throughout the several views, Figure 1 is a longitudinal sectional view taken substantially through the improved guard tooth for mowers as constructed according to the present invention.

Figure 4 is a horizontal section taken immediately below the arm 18.

Figure 5 is a view similar to Figure 4 but with the ledger plate removed.

Figure 6 is a plan view of the improved ledger plate detached from the guard tooth.

Figure 7 is an end view of the same.

Figure 8 is a side edge view of the improved ledger plate.

Figure 1:
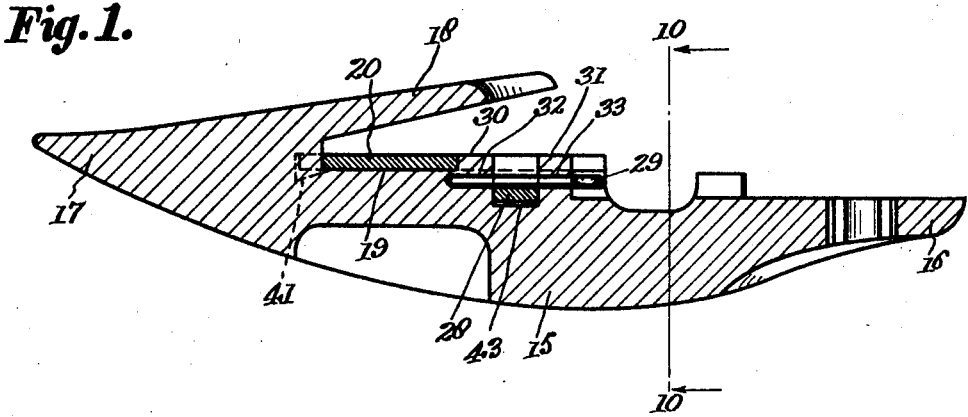

Referring more particularly to the drawings the guard tooth is represented generally at 15 and is provided with the perforated shank 16 whereby it may be attached to the mower in accordance with prevailing custom.

The guard tooth 15 conforms generally as to external outline with the conventional form of tooth and the point or nose of the tooth is indicated at 17. The arm is indicated at 18 and extends from the rear upper portion of the nose, flaring upwardly toward the rear of the tooth; and below this arm 18 is a stepped-down portion 19 of substantially flat form for removably receiving the improved ledger plate indicated at 20.

This ledger plate is shown more particularly in Figures 6, 7 and 8 and is provided with the inclined cutting edges 21 and 22 which are intended to extend beyond the sides of the tooth 15 for cooperating with the reciprocating cutter bar. At its forward narrower end, the cutter bar is made with a central cut away portion 23 lying between the lugs or horns 24 and 25.

A central slot 26 is made in the ledger plate 20 and spaced from this closed slot 26 is another slot 27 open at one end through the larger end of the ledger plate.

As shown more particularly in Figure 7, a depressed portion 28 of the plate 20 lies between the slots 26 and 27 and forms with the main body of the plate a latch loop for receiving a locking pin or cotter pin 29.

The loop 28 is adapted to lie between lugs 30 and 31 of the guard finger, which lugs extend up above the plane of the flat plate receiving surface 19, but as shown in Figure 1 the perforations 32 and 33 which are in the body of the guard finger immediately beneath the lugs 30 and 31, respectively, therein extend below the plane of the ledger plate 20, so as to be in registry with the loop 28 when the ledger plate is in the operative position, shown in Figures 1, 2 and 3.

Figure 3:
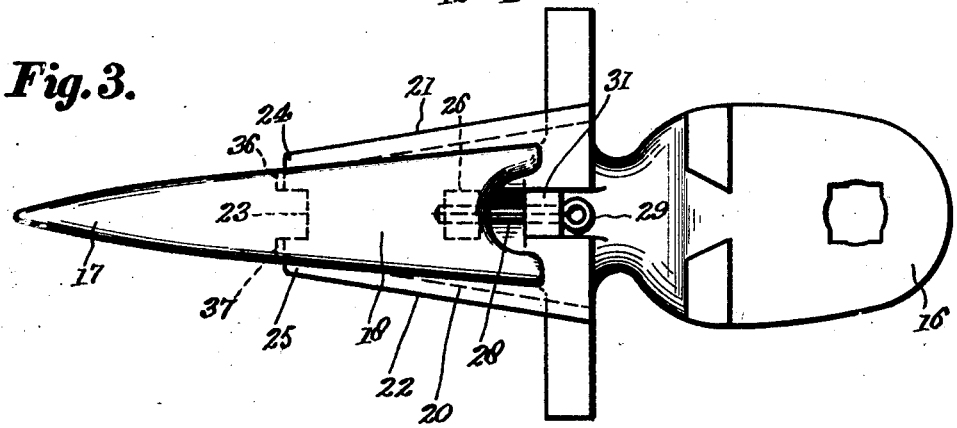
Figure 3 is a top plan view thereof.
Figure 12:
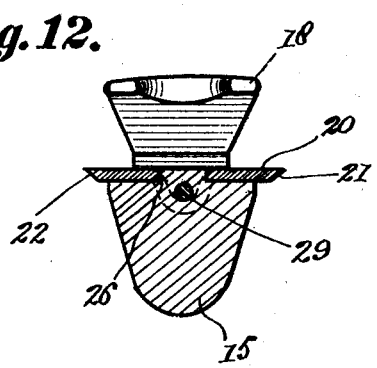
Figure 12 is also a transverse section taken on the line 12—12 in Figure 2.

The slot walls 34 and 35 of the ledger plate 20 are shown as abutting against the adjacent walls of opposite lugs 30 and 31 and in Figures 3 and 12 the lateral walls of the slots 26 and 27 of the ledger plate 20 are shown as engaging against the adjacent side walls of the lugs 30 and 31, or at least of those portions of the lugs which extend above the flat plate receiving surface 19.

The lug 31 is not so deep as the slot 27 in the ledger plate 20 which receives the same, but, as shown in Figure 3, the open end portion of the slot 27 and the rear edge of the ledger plate extends beyond the lug 33 and the socket is thus formed for receiving the head or eye of the cotter pin 29 and for protecting same and preventing the head from being dislodged from locking position or accidental engagement of moving parts therewith.

The forward prongs 24 and 25 of the ledger plate 20 are arranged to fit into sockets 36 and 37 at the nose portion of the tooth and at the base of the arm 18. These sockets 36 are in alinement with the plane of the plate 20 when in place upon the flat surface 19. These sockets 36 and 37 are open at their rear ends and at their outer sides but they are closed forwardly and have the substantially parallel walls 38 and 39 to form abutments against the lateral movement of the ledger plate 20 or against the pivotal movement thereof. An abutment or wall 40 connects the walls 38 and 39 rearwardly of the sockets 36 and 37 and is arranged to engage the forward end of the cut away portion 23 of the ledger plate 30 as to confine such ledger plate 20 against any forward creeping.

In the use of the device, a cutter bar is received upon the ledger plate 19 and beneath the arm 18 and is reciprocated in the usual way, such cutter bar being provided with cooperating teeth to coact with the inclined edges 21 and 22 of the ledger plate, whereby to provide a shearing action for the cutting of grass, etc. Ordinarily ledger plates exhibit a tendency to move forward on the surface 19 and to thus become dislodged and while springs have ben suggested for the purpose of retaining the plates in position, this solution of the problem has not been a particularly successful one.

Figure 2:
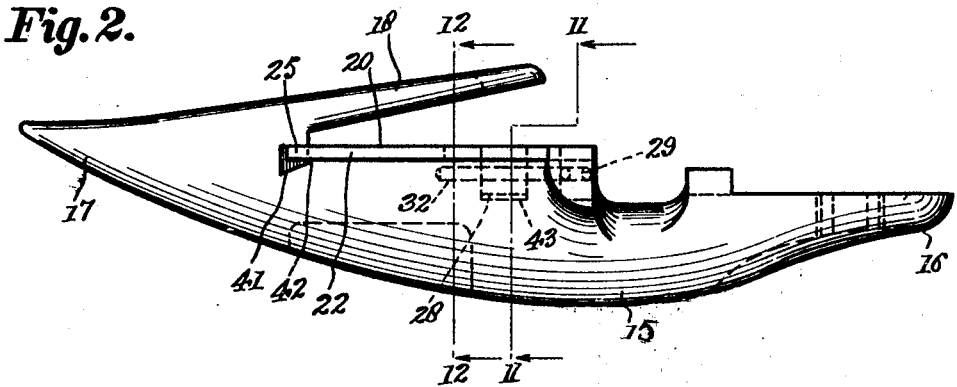
Figure 2 is a side elevation of the same.

According to the present invention the ledger plate 20 is restrained against both longitudinal and lateral movement, once it is secured in place in the flat position on the surface 19, as shown in Figures 1, 2 and 3.

The loop portion 28 cooperates with the lugs 30 and 31 and the walls of the slots 26 and 27 in the ledger plate cooperate with the upwardly projecting portions of said lugs, and in a similar way the forward prongs 24 and 25 cooperate with the sockets 36 and 37 and with the abutment walls 38, 39 and 40. In removing and replacing the ledger plates 20, the same may be canted up to the position shown in Figure 9, which movement is permitted by the depth of the sockets 36 and 37.

The sockets are preferably formed with downwardly and forwardly inclined front walls 41 which form fulcrums 42 on which the plates 20 may be rocked in moving the same into and out of operative position, and moreover such walls permit the prongs 25 and 26 on the ledger plates to be received downwardly in the prolongations of the sockets thus made by the inclined walls.

Figure 9:
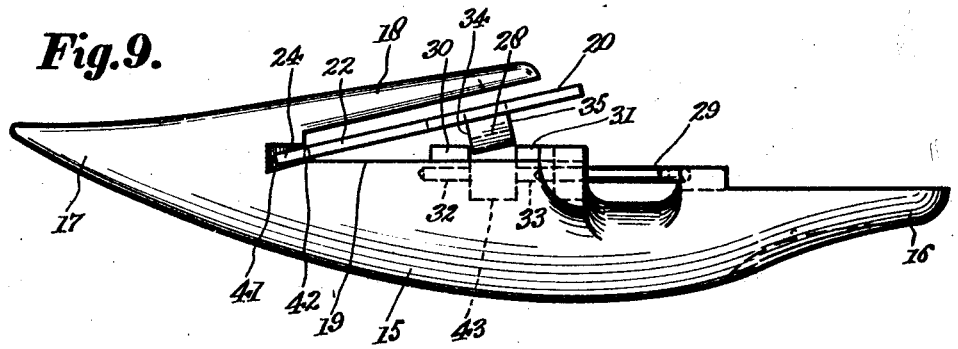
Figure 9 is a side elevation similar to Figure 2 but showing the ledger plate in the partially removed position.
Figure 10:
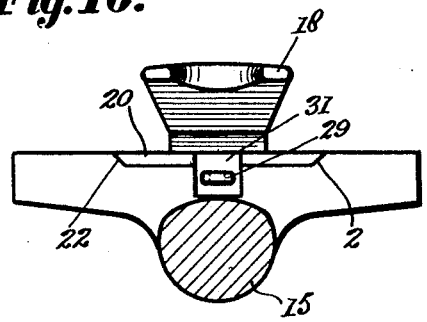
Figure 10 is a cross section taken on the line 10—10 in Figure 1.
Figure 11:
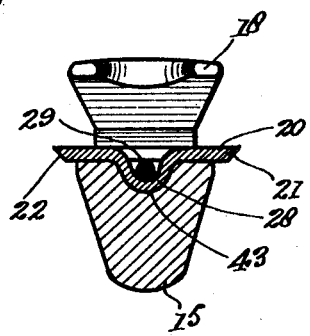
Figure 11 is a similar view taken on the line 11—11 in Figure 2.

In replacing the ledger plates, the forward prongs are fitted downwardly into the sockets and substantially along the bottom walls 41 with the ledger plates assuming the inclined diagonal position, indicated in Figure 9. After the prongs have been slid into the sockets, until the wall of the cut-away portion 23 strikes the abutment 40, the plate is dropped, the loop 28 being directly over the socket 43 in the tooth 15 between the lugs 30 and 31. The pin 29 is then inserted through the registering openings 32, 33 and through the loop, and the head of the pin occupies the rear portion of the slot 27.

When the ledger plate is to be removed, an instrument may be inserted through the eye of the pin 29 and the pin may be thereby moved rearwardly, as indicated in Figure 9 to free the loop 28 and permit the lifting of the ledger plate.

I do not wish to be restricted to the size, form, and proportions of the various parts, and obvious changes could be made in the construction herein described without departing from the spirit of the invention, it being only necessary that such changes fall within the scope of the appended claims:—

What is claimed is:—

1. A guard tooth for mowers comprising a tooth body having a seating surface with a socket therein, a ledger plate received on said seating surface and having a looped portion entering said socket, and means carried by the tooth for engaging said portion to retain the ledger plate in position.

2. A guard tooth for mowers comprising a tooth body having a seating surface and a socket with lugs adjacent the socket and a ledger plate received on said surface and having a perforated part to fit into said socket, said tooth body having perforations immediately beneath said lugs and a locking means movable through the perforated portions of said tooth body and part.

3. A guard tooth for mowers comprising a tooth body having a seating surface with lugs upstanding therefrom and a socket between the lugs and below the seating surface, a ledger plate received on said surface and having slots to receive said lugs, said plate having a loop extending into said socket, said tooth body having perforations therein immediately beneath said lugs and locking means movable in the perforations and loop.

4. A guard tooth for mowers comprising a tooth body having a seating surface with lugs upstanding therefrom and a socket between the lugs and below the seating surface, a ledger plate having a loop to enter the socket and slots to pass over the lugs, said tooth body having perforations therein immediately beneath said lugs and a pin slidable through said loop and said perforations to hold the plate to the tooth.

5. A guard tooth for mowers comprising a tooth body having a seating surface, a ledger plate adapted to be placed upon said seating surface and having a depressed loop portion and slots at opposite ends of said loop portion, lugs on said tooth body spaced apart for receiving said slots, said tooth body having a socket therein between the lugs for receiving the loop and perforations immediately beneath said lugs, and a pin for passing through said perforations and said loop.

6. A guard tooth for mowers comprising a tooth body having a seating surface and corner recesses at the forward portion of said seating surface, said recesses having inclined bottom surfaces with fulcrum portions at the rear ends of said bottom surfaces, and a ledger plate received on said seating surface and having projections for entering said recesses and for engaging upon said fulcrum portions.

7. A guard tooth for mowers comprising a tooth body having a seating surface and corner recesses at the forward portions of said seating surface with inner and forward walls but without rear or outer walls, said recesses having forwardly and downwardly inclined bottoms from the seating surface, a ledger plate received upon said seating surface and having corner projections for entering said recesses and tilting therein, said tooth body having at the rear portion of the seating surface a socket with perforations at opposite sides of said socket and with lugs upstanding above the seating surface at opposite sides of said socket, a loop portion of said ledger plate adapted to enter the socket, said plate having slots to receive said lugs, and a pin passing through the perforations and loop portion.

8. A guard tooth for mowers comprising a tooth body having a seating surface with lugs upstanding therefrom and a socket between the lugs and below the seating surface, a ledger plate having a looped portion to enter the socket and slots to receive the lugs and means carried by the tooth to enter said looped portion.

In testimony whereof, I have affixed my signature.

LOUIS J. BORKHUIS.